2,840,506

GASTRO-INTESTINAL THERAPEUTIC COMPOSITION CONTAINING UREA AND CARBON DIOXIDE

David J. Goodfriend, Philadelphia, Pa., assignor of one-half to Charles E. Vanderkleed, Collingswood, N. J.

No Drawing. Application February 6, 1957
Serial No. 638,434

7 Claims. (Cl. 167—55)

This invention relates to a composition and method for treating the symptoms and conditions of the gastro-intestinal tract associated with hyperacidity, peptic ulcer, peptic ulcer syndrome, acid-base imbalance within the mucosal cells and on the mucosal surfaces, and inadequacy of the urease-urea and carbonic anhydrase-carbonic dioxide enzyme systems.

This application is a continuation-in-part of copending application Serial No. 272,913 filed February 21, 1952 now abandoned.

Inflammation, breakdown, and ulcerations of the lining of the gastro-intestinal tract, such as peptic ulcers of the stomach and duodenum may result from abnormal balance of the secretion of hydrochloric acid and enzyme functions in the stomach, and the effect of this abnormality in the duodenum and other parts of the gastro-intestinal tract. These conditions in turn give rise to, or are associated with heartburn, pain, distention, indigestion, discomfort and other symptoms of the stomach and gastro-intestinal tract.

The abnormal balance of the secretion of hydrochloric acid and enzyme functions in the stomach consists of the variation of the amount of hydrochloric acid which is secreted, the adequacy of the urease-urea reaction in and on the gastric mucosa, the adequacy of the carbonic anhydrase-carbon dioxide reaction within the gastric and duodenal mucosae, and the adequacy of available carbon dioxide in the stomach lining and contents for ion exchange in relation to the production and secretion of hydrochloric acid by the stomach and sodium bicarbonate by the duodenum.

The importance of the carbonic anhydrase-carbon dioxide reaction is that this reaction within the mucosal cells neutralizes alkali formed within the gastric cells concomitantly with the secretion of hydrochloric acid. This reaction in the duodenal mucosa is a source of bicarbonate ions for secretion of sodium bicarbonate by the duodenal secretory mechanism.

If the urease-urea reaction is inadequate and the quantities of ammonia, and ammonium carbonate on the mucosal surface and in the stomch contents are insufficient, the concentration of hydrochloric acid on the muscosal surface may be abnormally strong and cause inflammation, degeneration and ulceration of the mucosa. Abnormally strong concentrations of acid may abnormally activate pepsin resulting in auto-digestion of the mucosal surface. Inadequate supplies of carbon dioxide, as will be shown later, may result in degeneration of the mucosal cells and inflammation and ulceration of the mucosal lining of the stomach. Hyperacidity of the stomach may cause corrosion and ulceration of the duodenum. Inadequate supplies of carbon dioxide and carbonates, which may be attributable to inadequate urease-urea reaction in the stomach may cause disturbances of digestion in the stomach and duodenum, and inflammation and ulceration of the mucosa. All these factors and conditions may be associated with symptoms and disturbances of the gastro-intestinal tracts such as pain, distention, dyspepsia, acidosis, and indigestion. This invention provides a composition which treats, corrects and prevents these conditions and diseases because the ingredients of my composition provide the basis for and result in maximum activity of the reaction of urease and urea on and in the mucosa of the stomach and duodenum.

The quantity and adequacy of the urease-urea reaction in and on the lining of the stomach is directly related to the presence in the contents of the stomach and in the blood of optimum quantities of urea. Cells in and on the mucosa have inherent capacity to synthesize the enzyme urease. The amount of urease which these cells actually synthesize is directly related to the amount of urea in the cells' environment. The optimum concentration of urea in the environment of these cells is from 0.4 to 10 percent. Another factor which favorably influences the reaction of the urease with urea on and in the mucosa and stomach is the hydrogen ion concentration of the media. While the mucosal cells secrete hydrochloric acid, they are themselves neutral in reaction. The optimum hydrogen ion concentration for maximum urease-urea reaction is from about 6.0 to 7 pH. The optimum urea concentration in the media of optimum hydrogen ion concentration is provided by this invention as the result of its critical proportions and the synergistic action of its ingredients.

The abnormal action of pepsin is also an important factor in the cause of inflammation, degeneration and ulceration of the mucosal lining of the stomach and duodenum and in the cause of symptoms which may be associated with these conditions. The abnormal action of pepsin is in turn caused by the elevation of concentration or strength of hydrochloric acid in the stomach and on the mucosa. This abnormal pepsin activity is inhibited and prevented by the urease-urea reaction. Thus, the urease-urea reaction on the surface of and in the surface cells of the gastric mucosa prevents and controls pepsin action. This invention provides a composition when properly administered as disclosed herein which controls and prevents abnormal activity of pepsin on the surfaces of the gastric and duodenal mucosal lining and thereby alleviates and prevents symptoms and conditions associated with and caused by abnormal pepsin activity in these area.

The normal digestion of proteins is an essential function of the stomach for nourishment, health and comfort of persons. The optimum proportions of urea and carbon dioxide provided by this invention are synergistic in stimulating and maintaining maximum effective digestion of protein in the stomach and duodenum, first, by stimulating proteolytic digestion, and second, by dissolution and preparation of certain proteins for digestion by certain enzymes.

The oxyntic cells of the gastric mucosa secrete hydrochloric acid of a constant strength. The concentration and the strength of this acid on the surfaces of the lining of the stomach is controlled by the neutralizing factors of the mucosa. The urease-urea reaction is a most important factor in the neutralization of the acid on the mucosal surface. This in turn depends upon the amount of urease produced by the mucosal cells and, as has been shown, this depends upon the presence of urea in the environment of the mucosal cells. The normal sources of urease and urea in the lining of the stomach include urea which is contained in some foods, and urease which is produced by the cells associated with the mucosa. Commercial food refining processes remove urea or urea-forming substances from foods, and excessive heat in cooking and baking may also remove urea from foods. These factors may be responsible for inadequate urea and urease in the lining of the stomach and thus cause peptic ulcers and associated symptoms, in much the same manner as the polishing of rice causes beri-beri. The present invention remedies conditions produced by the absence of urea in refined foods.

When the oxyntic cells of the mucosa of the stomach secrete hydrochloric acid in one direction they also produce hydroxyl ions in the other. These hydroxyl ions are neutralized and transferred to the surrounding media in combination with carbon dioxide as bicarbonates. In animal experiments a molecule of carbon dioxide was utilized for each molecule of hydrochloric acid which was secreted, and one bicarbonate ion was passed into the nutrient fluid in exchange for one chloride ion. As long as these molecule and ion exchanges were balanced, the mucosa was healthy. When the rate of acid secretion rose above the rate of carbon dioxide production, external supplies of carbon dioxide were required. If external supplies were not available, the gastric mucosa of these animals became ulcerated. This condition and damage was the result of disturbances of the acid-base balance within the cell so that unneutralized alkali accumulated and caused degeneration of the cell. This condition and damage never occurred when adequate supplies of carbon dioxide were available.

This relationship of acid secretion to carbon dioxide supplies is true for the much more active human stomach. Actively acid-secreting stomachs require external supplies of carbon dioxide in addition to that resulting from metabolism in the stomach, and that dissolved in the arterial blood. This important function of carbon dioxide in the mucosal cells is catalyzed by the action of the enzyme carbonic anhydrase. This enzyme is formed in these cells by synthesis which is stimulated and supported by carbon dioxide and carbonates in the stomach contents and in the blood, just as the quantity of urease in these cells is influenced by urea in the stomach and in the blood. The composition in accordance with this invention supplies carbon dioxide directly to the mucosal cells, forms carbon dioxide and ammonium carbonate which is available to the mucosal cells and blood and thereby provides adequate carbon dioxide and carbonic anhydrase-carbon dioxide reaction to prevent the disturbance of the acid-base balance within the mucosal cells and their resultant degeneration. Thus, this invention prevents the degeneration of the mucosal cells and thereby prevents the formation of peptic ulcers of the stomach and duodenum.

Factors which cause and aggravate pain and discomfort, indigestion and disturbances, and prevent the healing of inflammation, degeneration and ulcerations of the gastro-intestinal tract include the accumulation of debris and necrotic material on the surfaces of the mucosal linings. The critical proportion of the ingredient urea in this invention effectively dissolves and cleans away necrotic and debris materials from the surfaces of the linings of the stomach and duodenum and thereby removes these irritants and causes of disturbance. The urea also stimulates the formation of granulation and vascular tissue in inflamed, degenerating and ulcerated areas, thereby favorably influencing the healing of inflamed mucosa and peptic ulcers and treating, controlling and preventing the symptoms associated with these conditions.

This invention provides a composition which as administered consists of a synergistic combination of urea, which is the end-product of protein metabolism and the substrate of the urease-urea enzyme system, with carbon dioxide, which is the end-product of carbohydrate metabolism and the substrate of the carbonic anhydrase enzyme system, in a medium which has a pH favorable for urease-urea and carbonic anhydrase-carbon dioxide reactions, is diffusible and is a source of cationic ions, accomplishes the surprising results of effectively treating, preventing and controlling the symptoms and conditions of the gastro-intestinal tract associated with hyperacidity, peptic ulcer disease, acid-base imbalance within the mucosal cells and on the mucosal surfaces, and inadequacy of the urease-urea and carbonic anhydrase-carbon dioxide enzyme systems. The present invention thus offers means to maintain the carbonic anhydrase and urease enzyme systems in proper balance so as to permit proper functioning of the defense mechanisms of the gastro-duodenal mucosae. The interaction of the carbonic anhydrase and urease enzyme complex maintains the acid-base or hydrogen ion equilibrium of the mucosal cells in the presence of intra-mucosal and extra-mucosal acid and alkali, and thereby fulfills the functions of the natural mechanism which enable the gastro-duodenal mucosae to resist ulceration.

The following examples are illustrative embodiments of my invention, the parts being given by weight:

Example 1

An aqueous solution is prepared containing 80 cc. of water saturated with carbon dioxide at 20° C. and containing 36 grains of urea and 31.3 grains of sodium citrate. This solution freshly prepared is administered every 4 hours, preferably between meals and once before retiring. This solution contains 3% by weight of urea and has a pH from about 6 to 7.

Example 2

A granular composition is prepared having the following ingredients by weight:

| | Percent |
|---|---|
| Urea | 40 |
| Sodium bicarbonate | 34 |
| Anhydrous citric acid | 26 |

A rounded teaspoonful (90 grains) of this composition is dissolved in ⅓ glass of water at room temperature. The resulting solution will provide the aqueous composition of Example 1 and is administered freshly made up every 4 hours as in Example 1.

Example 3

| | Percent |
|---|---|
| Urea | 40 |
| Sodium bicarbonate | 32 |
| Citric acid | 12 |
| Tartaric acid | 16 |

The foregoing composition may be made up as a mixture or granules. One rounded teaspoonful is dissolved in about 3 oz. water at room temperature and administered every 4 hours as in Example 1.

Example 4

| | Percent by weight |
|---|---|
| Urea | 3 |
| Sodium citrate | 3 |
| Saturated aqueous solution of carbon dioxide | 94 |

One-third of a glass of this composition is administered every 4 hours as in Example 1. Flavoring and color may be added if desired.

According to my invention I provide a composition of a synergistic combination of predetermined proportions of active ingredients of urea and a water-soluble effervescent mixture of alkali carbonates or bicarbonates, such as sodium carbonate, sodium bicarbonate, potassium bicarbonate, and lithium bicarbonate, and a dibasic or tribasic organic acid, such as tartaric acid or citric acid. When dissolved in water in predetermined amounts, such compositions produce a solution containing about 1 to about 10% by weight of urea in a saturated solution of carbon dioxide and preferably about 3% urea, the solution being buffered to have a pH from about 6.0 to 7. The citrate or tartrate salts present in the resulting solutions serve as a buffer to maintain the solution at a pH from about 6.0 to 7. My invention thus relates to administering an aqueous solution comprising water saturated with carbon dioxide, 1 to 10% by weight of urea, preferably 3% by weight, and a water-soluble buffer to maintain the solution at a pH from about 6.0 to 7 which is administered in single dosages or total dosages per 24 hours so that no single dosage or total of all dosages administered will exceed the level which will produce diuresis in the patient. Thus, according to my invention, I administer 36 grains of urea as a maximum single dosage and 216 grains of urea as a maximum total dosage for 24 hours. This amount of urea is far below the minimum amount of urea which is required to produce diuresis as shown by Remington's Practice of Pharmacy, 11th Ed. 1956, p. 828, Easton, Pa., and The Dispensatory of the United States of America, 25th Ed. 1955, p. 1476, Philadelphia, Pa. These publications state that urea is usually administered in a single dose of 20 gms. (or 300 grains) 2 to 5 times daily (or 600 to 1500 grains) to produce diuresis. Extensive clinical tests with my invention show that diuresis is not produced over prolonged periods of administration within the urea concentrations and dosage of my invention. These clinical tests also show that urea alone within the critical amounts herein indicated is not effective in the treatment of peptic ulcer disease and syndrome unless administered in combination with a saturated solution of carbon dioxide and buffered to have a pH from about 6.0 to 7 as provided by my invention.

The mechanism of action of my composition when administered as herein disclosed is to supply substrates in optimum concentration and medium to the carbonic anhydrase and urease enzymes for maximum action and synthesis of these enzymes in and on the gastro-duodenal mucosae, in order to rehabilitate and reenforce the values of these enzyme systems in establishing and maintaining the acid-base equilibrium of the mucosal cells and thereby establish conditions conducive to healing and normal digestion and enable the mucosae to resist the irritating and ulcerating effects of excessive hydrochloric acid.

The dosage of my invention is thus critical. The extensive clinical results of my peptic ulcer therapy show that four to six doses daily for four weeks is indicated to completely heal the peptic ulcer and rehabilitate the defense mechanism and normal function of the gastro-intestinal mucosae. It would not be possible to utilize this critical dosage if the concentration of urea in single dosage was higher because higher concentrations of urea inhibit enzyme action as previously explained.

My invention establishes a healthy acid-base balance in and on the surfaces of the lining of the stomach and duodenum, thereby preventing the inflammation, corrosion, and ulceration of these areas by the hydrochloric acid and also inhibits abnormal action of pepsin on the surfaces of the lining of the stomach and duodenum, thereby preventing the inflammation and autodigestion of these surfaces by overactive pepsin. In addition to the aforementioned mechanism of action, beneficial therapeutic results are produced by my invention which may be attributed in part to cleaning away debris and necrotic materials from the surfaces of the lining of the stomach, duodenum, and other parts of the gastro-intestinal tract; and stimulating the formation and proliferation of granulation and vascular tissue in inflamed, broken-down, and ulcerated areas, thereby removing irritants, relieving pain, and favorably influencing the healing of these conditions in these areas.

It is to be understood that my invention is not restricted to the specific examples given which are merely illustrative of the essential features of my invention and that it is intended to claim this invention within the scope of the appended claims.

I claim:

1. An aqueous composition for the treatment of gastro-duodenal peptic ulcer and peptic ulcer syndrome comprising water saturated with carbon dioxide gas, about 3% by weight of urea, and a water-soluble buffer to maintain the solution at a pH from 6.0 to 7 at room temperature.

2. An aqueous composition for the treatment of gastro-duodenal peptic ulcer and peptic ulcer syndrome comprising water saturated with carbon dioxide gas, about 3% by weight of urea and about 3% by weight of sodium citrate.

3. The method of treating gastro-duodenal peptic ulcer and peptic ulcer syndrome which comprises orally administering to a living human being having gastro-duodenal peptic ulcer and peptic ulcer syndrome an aqueous solution of substrates of the carbonic anhydrase and urease enzyme systems of the human gastro-duodenal mucosae comprising an aqueous solution of 1 to 10 percent by weight of urea and a water-soluble carbon dioxide generating effervescent mixture of an organic acid selected from the group consisting of citric acid and tartaric acid and a salt selected from the group consisting of sodium, potassium and lithium carbonates and bicarbonates in amounts to produce a saturated solution of carbon dioxide in water and having a pH of from about 6.0 to 7, the total amount of urea administered in said solution not exceeding about 36 grains in a single dose and not exceeding a total of about 216 grains in 24 hours.

4. The method of treating gastro-duodenal peptic ulcer and peptic ulcer syndrome which comprises orally administering to a living human being having gastro-duodenal peptic ulcer and peptic ulcer syndrome an aqueous solution of substrates of the carbonic anhydrase and urease enzyme systems of the human gastro-duodenal mucosae comprising an aqueous solution of 1 to 10 percent by weight of urea and 99 to 90 percent by weight of a saturated solution of carbon dioxide and having a pH of from about 6.0 to 7, the total amount of urea administered in said solution not exceeding about 36 grains in a single dose and not exceeding a total of about 216 grains in 24 hours.

5. The method of treating gastro-duodenal peptic ulcer and peptic ulcer syndrome which comprises orally administering to a living human being having gastro-duodenal peptic ulcer and peptic ulcer syndrome an aqueous solution of substrates of the carbonic anhydrase and urease enzyme systems of the human gastro-duodenal mucosae comprising an aqueous solution of 1 to 10 percent by weight of urea and an effervescent mixture of an organic acid selected from the group consisting of citric acid and tartaric acid and a salt selected from the group consisting of sodium, potassium and lithium carbonates and bicarbonates in amounts to produce a saturated solution of carbon dioxide in water to establish a normal acid-base balance in the gastro-duodenal mucosae and having a pH of about 6.0 to 7, the total amount of urea administered in said solution not exceeding about 36 grains in a single dose and not exceeding a total of about 216 grains in 24 hours.

6. The method of treating gastro-duodenal peptic ulcer and peptic ulcer syndrome which comprises orally administering about every 4 hours to a living human being having gastro-duodenal peptic ulcer and peptic ulcer syndrome about 80 cc. of a composition comprising water saturated with carbon dioxide gas, 1 to 10 percent by weight of urea and sodium citrate in amount to maintain the pH of the solution from about 6.0 to 7, the total amount of urea administered in said composition not exceeding about 36 grains in a single dose and not exceeding a total of about 216 grains in 24 hours.

7. The method of treating gastro-duodenal peptic ulcer and peptic ulcer syndrome which comprises orally administering about every 4 hours to a living human being having gastro-duodenal peptic ulcer and peptic ulcer syndrome about 80 cc. of a composition at room temperature comprising water saturated with carbon dioxide gas, about 3 percent by weight of urea and about 3 percent by weight of sodium citrate to maintain the pH of the solution from about 6.0 to 7, the total amount of urea administered in said composition not exceeding about 36 grains in a single dose and not exceeding a total of about 216 grains in 24 hours.

References Cited in the file of this patent

Fitzgerald, Irish Jour. of Med. Sci., March 1950, pp. 119–126.

Schiessl, Munch. Med. Wochenschr., vol. 84, 1947, pp. 220–222.

Davies, Biochemical Jour., vol. 42, 1948, pp. 621–627.

Montague, Abst. of Med. Record, vol. 143, 1936, p. 101.